June 19, 1934.  F. W. BREHM  1,963,289
OBJECTIVE ILLUMINATING DEVICE
Filed May 6, 1932
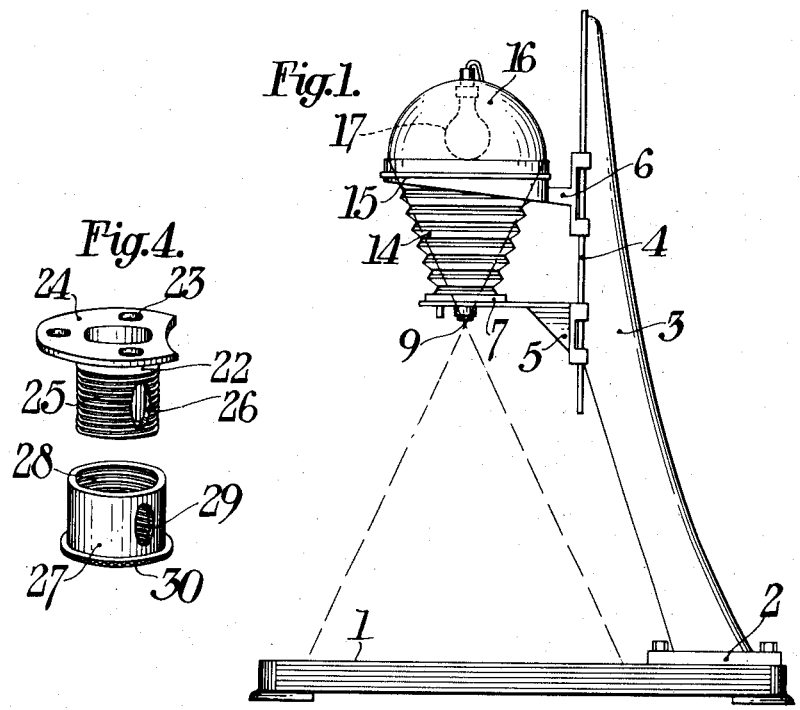
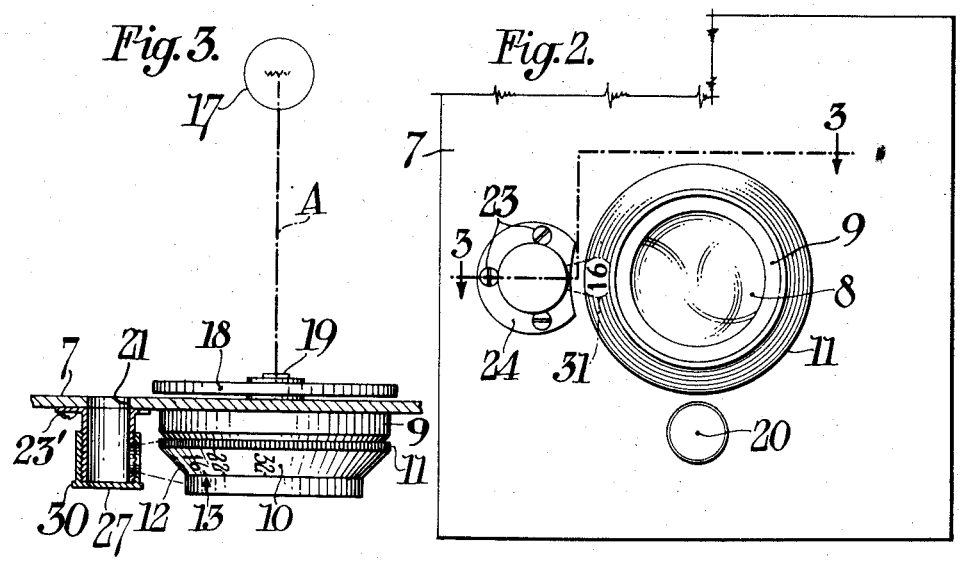
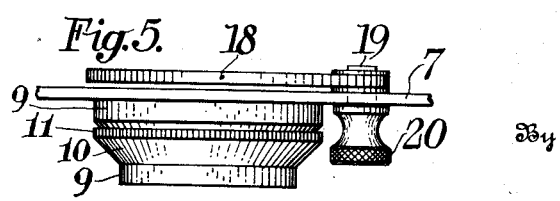
Inventor:
Frederick W. Brehm, Patented June 19, 1934

1,963,289

UNITED STATES PATENT OFFICE 1,963,289

OBJECTIVE ILLUMINATING DEVICE

Frederick W. Brehm, Rochester, N. Y., assignor to Eastman Kodak Company, Rochester, N. Y., a corporation of New York Application May 6, 1932, Serial No. 609,682

4 Claims. (Cl. 240—1.3)

This invention is related to photography and more particularly to a device for illuminating a predetermined portion of an objective which is particularly suited for use on enlarging cameras.

One object of my invention is to provide a device which is suitable for use in a darkroom for directing a small beam of light upon a scale carried by an objective in such a manner that light sensitive photographic material in the same darkroom will not become fogged. Another object of my invention is to provide an objective on an enlarging machine with a means for viewing the diaphragm scale of the objective during the operation of the enlarger in a darkroom. Another object of my invention is to provide a light-tight closure in which a lamp is mounted with a means extending through the light-tight closure and reflecting rays from the lamp to a predetermined area outside of the light-tight closure, and other objects will appear from the following specification the novel features being particularly pointed out in the claims at the end thereof.

Coming now to the drawing wherein like reference characters denote like parts throughout:

Fig. 1 shows a side elevation of an enlarging machine provided with an objective scale illuminating device constructed in accordance with and embodying a preferred form of my invention.

Fig. 2 is a bottom view to enlarged scale of the enlarging machine lens board and illustrates the relative position of the objective scale illuminating device according to the invention.

Fig. 3 is a section on line 3—3 of Fig. 2.

Fig. 4 is a detail view in exploded perspective of the two parts of the objective scale illuminating device, and Fig. 5 is a side elevation of the lens board shown in Fig. 2.

In making enlargements in a darkroom, it is customary to focus the image of a negative upon a white sheet in the focal plane of the objective and to substitute for the white sheet photographic paper making an exposure by means of a hand-operated or automatic shutter.

In order to focus the image sharply, the diaphragm is usually opened up to its full aperture during the focusing operation and is ordinarily later stopped down so that when the exposure is made the diaphragm opening is much smaller than was used for focusing. Since the apparatus is always used in a darkroom, it is difficult to read the scale of the objective without a supplementary light, and even where the darkroom is illuminated with the usual dim, red light, the scale on the objective, being located close to the lens board, is in a difficult position to be read.

My invention is particularly directed to overcoming these difficulties by providing a means for casting a small beam of light upon a portion of the objective scale, this beam of light being so small and being confined to a predetermined angle in such a manner that sensitive material in the darkroom will not be affected.

As a typical example of my invention, the enlarger may be of a well known type in which a base 1 is adapted to carry a sheet of photographically light sensitive paper, one portion 2 of the base 1 supporting an upright bracket 3 having a pair of spaced rails 4 on which a lens carrier 5 and a negative holder 6 may slide.

The carrier 5 supports a lens board 7 which in turn supports the objective. The objective includes an objective lens 8 which is supported in a lens barrel 9 and may be provided in a known manner with an adjustable diaphragm (not shown) which is adjusted to various positions by rotation of the rotatable ring 10. The ring 10 is annularly provided with a knurled run 11 to facilitate rotation of ring 10 and is also annularly provided with a calibrated scale 12. An index 13 is engraved on the lens barrel 9 for registration with the scale 12 and for indicating the setting of the diaphragm.

A light-tight chamber extends between the camera 5 and negative holder 6, and is preferably composed of a bellows 14 which is extensible or collapsible. A photographic negative 15 is supported by the negative holder 6.

A reflector 16, which is preferably of elliptical characteristics, encloses the upper end of the light-tight chamber and contains a source of illumination such as an incandescent lamp 17. The source of illumination is located on the axis A of the objective. The reflector 16 is of recognized design and is adapted to direct all of the light from lamp 16 to the objective in a beam such as indicated by the dotted converging lines in Fig. 1.

Although the reflector 16 functions to confine all of the light from lamp 17 into a sharply defined beam, it is also necessary as an incident to operation of the apparatus as a reproduction device to introduce certain translucent mediums into the beam. The negative 15 is such a translucent medium and due to the diffusion characteristics of the metallic silver image or of matte surfaces often provided on films or film supports, a slight diffusion of the light occurs throughout the light-tight chamber or bellows 14. It is not practical or economical to re-direct all of the light into the beam but the present invention utilizes the stray diffused light for illumination of a scale 12 on the objective.

Light may be excluded either entirely or partially from passing through the objective by means of a shutter 18, this shutter being pivotally mounted upon a post 19 and being provided with a knurled operating knob 20 on the outside of the lens board.

If it is desired to totally obscure light, the shutter 18 may be of some material which will not transmit light, such as metal.

Some operators prefer that light should pass through the objective but that this light should not fog the photographic material. Consequently, the objective may be closed by a non-actinic light transmitting shutter which may be made of red or green glass or other suitable material.

In any event, when the shutter crosses the axis A of the objective, the light passing through the objective is reduced or eliminated to such an extent that the diaphragm scale 12 is not easily legible.

Consequently, in accordance with my invention, I provide a light conducting means which extends into a zone of diffused light only within the light-tight chamber and which directs these diffused light rays onto a small portion of the scale 12 for illumination thereof.

The light conduit for directing diffused light from the light-tight chamber to the scale 12 has one end opening into a zone of diffused light within said chamber and the other end in juxtaposition to the scale 12 on the objective and for directing light to illuminate said scale 12. Such a light conduit is shown in Fig. 4, and may be composed of a tubular member 22 which has an externally threaded sleeve 25 provided with an aperture 26, which has a flange 24 provided with holes 23, and which is fastened to lens board 7 to cover an aperture 21 therein by means of screws 23' passing through holes 23. A cup-shaped member 27 internally threaded at 28 to receive the thread 25 is also provided with an aperture 29 of substantially the size and shape of aperture 26. The lower edge 30 of the cup-shaped member may be knurled for convenience in turning this member upon the tube, and, as will appear obvious from Fig. 3, when the cup-shaped member 27 is turned until the apertures 26 and 29 register, a small amount of light may be reflected upon a limited area 31 of the objective barrel sufficient to clearly distinguish the figure on the scale 12 which is brought opposite to the index 13. If it is necessary to increase the amount of light, the inside of the tubular member 22 may be painted white, but I have not found that this is necessary.

As is customary with enlarging machines of this type, the negative 15 is inserted into the beam of light from the lamp 17, which light passes through the negative and under the influence of the objective forms an image of the negative upon the easel or paper holder 1.

When a negative has been placed into position, the knurled ring 11 is turned until the diaphragm of the objective is fully opened, in which position an image of the negative is carefully focused upon the support 1.

If desired, the diaphragm can then be reduced to any desired setting by turning the knurled edge 30 operating the cup-shaped member 27 to permit a beam of light to form upon the area 31 of the lens barrel. After adjusting the knurled ring 11 to suitably position the diaphragm of the objective, the knurled head 30 may be turned to close the aperture 26 so that light will not pass to the objective. The exposure can then be made by means of the shutter 18 in the usual way.

With most photographic papers, it is possible to permit the aperture 26 to continually reflect light to the area 31 of the lens barrel, since very little light is reflected towards the paper held by the base 1. However, where extremely sensitive paper is used, it is best to cut off the light from the aperture 26 except when it is necessary for adjusting the lens diaphragm.

What I claim is:

1. In a photographic reproducing apparatus for use in a darkroom, the combination with a light-tight chamber, an objective at one end of said chamber, a source of illumination at the other end of said chamber, and a reflecting means for enclosing said other end of the chamber and for focusing the light from said source of illumination into a beam upon said objective, of a scale upon said objective and outside of said chamber, a translucent medium located in the beam of light as an incident to operation of the apparatus and which causes slight diffusion of the light throughout said chamber, and a light conducting means adjacent said objective and for directing diffused light from the interior of said chamber onto the scale on said objective.

2. In a photographic reproducing apparatus for use in a darkroom, the combination with a light-tight chamber, an objective at one end of said chamber, a source of illumination at the other end of said chamber, and a reflecting means for enclosing said other end of the chamber and for focusing the light from said source of illumination into a beam upon said objective, of a scale upon said objective and outside of said chamber, a photographic negative located in the beam of light as an incident to operation of the apparatus and which causes slight diffusion of the light through said chamber, and a light conducting means adjacent said objective and for directing only diffused light from the interior of said chamber onto the scale on said objective.

3. In a photographic reproducing apparatus for use in a darkroom, the combination with a light-tight chamber, an objective at one end of said chamber, a source of illumination at the other end of the chamber, and a reflecting means for enclosing said other end of the chamber and for focusing the light from said source of illumination into a beam upon said objective, of a scale upon said objective and outside of said chamber, a translucent medium located in the beam of light as an incident to operation of the apparatus and which causes slight diffusion of the light throughout said chamber, and a light conduit having one end opening into the zone of diffused light within said chamber and the other end in juxtaposition to the scale on said objective and for directing light to illuminate said scale.

4. In a photographic reproducing apparatus for use in a darkroom, the combination with a light-tight chamber, an objective at one end of said chamber, a source of illumination at the other end of said chamber, and a reflecting means for enclosing said other end of the chamber and for focusing the light from said source of illumination into a beam upon said objective, of a scale upon said objective and outside of said chamber, a translucent medium located in the beam of light as an incident to operation of the apparatus and which causes slight diffusion of the light throughout said chamber, and a light conduit having one end communicating with a zone within said chamber containing only diffused light, and having an opening in the other end for directing diffused light only onto said scale of the objective.

FREDERICK W. BREHM.